US009426114B2

(12) United States Patent
Nguyen et al.

(10) Patent No.: US 9,426,114 B2
(45) Date of Patent: Aug. 23, 2016

(54) PARALLEL MESSAGE PROCESSING ON DIVERSE MESSAGING BUSES (71) Applicant: Red Hat, Inc., Raleigh, NC (US)

(72) Inventors: Filip Nguyen, Brno (CZ); Robert Balent, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 289 days.

(21) Appl. No.: 14/066,309

(22) Filed: Oct. 29, 2013

(65) Prior Publication Data
US 2015/0120853 A1  Apr. 30, 2015

(51) Int. Cl.
*G06F 15/16* (2006.01)
*H04L 12/58* (2006.01)

(52) U.S. Cl.
CPC ..................... *H04L 51/26* (2013.01)

(58) Field of Classification Search
CPC ....... H04L 51/26; H04L 67/322; H04L 65/80; H04L 12/2634; H04L 49/90; H04L 49/9047; H04L 49/3018; G06F 9/546; G06F 13/1684
USPC ........................................................ 709/207
See application file for complete search history.

(56) References Cited

U.S. PATENT DOCUMENTS

| 6,529,932 B1* | 3/2003 | Dadiomov | G06F 9/466 709/201 |
| 8,103,714 B2 | 1/2012 | Dorai et al. | |
| 8,805,938 B2* | 8/2014 | Yu | 709/206 |
| 2008/0196039 A1* | 8/2008 | Garrard | H04L 12/5693 719/314 |
| 2008/0201712 A1* | 8/2008 | Nottingham | G06F 9/546 718/101 |
| 2009/0271423 A1 | 10/2009 | Stallings | |
| 2010/0161362 A1 | 6/2010 | Shapira et al. | |
| 2011/0302254 A1* | 12/2011 | Yu | G06F 9/546 709/206 |
| 2012/0209903 A1 | 8/2012 | Salt | |
| 2012/0210335 A1* | 8/2012 | Salt | G06F 9/541 719/315 |
| 2012/0254891 A1* | 10/2012 | Roshen | G06F 9/5055 719/313 |
| 2013/0132458 A1 | 5/2013 | Little | |
| 2013/0254328 A1* | 9/2013 | Inoue | H04L 29/08 709/217 |

(Continued)

OTHER PUBLICATIONS

Progress Professional Services, Achieving Asynchronous/Parallel Processing of ESB Itinerary Fan-Outs, retrieved on Jan. 8, 2014 from https://community.progress.com/technicalusers/w/technologypartner/565.achieving-asynchronous-parallel-processing-of-esb-itinerary-fan-outs.aspx 2 pages, Progress Community.
Benosman, R. et al.; Performance Evaluation of a Massively Parallel ESB-Oriented Architecture; Dec. 17-19, 2012, pp. 1-4, Cedric Lab., CNAM, Paris, France/ $51^{TH}$ IEEE International Conference on Service-Oriented Computing and Applications (SOCS), 2012.

(Continued)

*Primary Examiner* — Brian J Gillis
*Assistant Examiner* — Javier O Guzman
(74) *Attorney, Agent, or Firm* — Haynes and Boone, LLP (57) ABSTRACT

Systems, methods, and techniques are disclosed for processing messages using a messaging bus. An example system includes an input queue that stores one or more input messages and an output queue that stores one or more output messages. The example system also includes a first service residing in a first messaging bus. In a composite transaction, the first service processes a first message and generates a second message in accordance with processing the first message. The example system further includes a transaction manager that places the second message in the output queue. The second message is routed from the output queue to a second service residing in a second messaging bus for processing, and the first and second messaging buses are diverse. The second service processes, during the composite transaction, the second message.

20 Claims, 4 Drawing Sheets

(56) References Cited

U.S. PATENT DOCUMENTS

| | | | |
|---|---|---|---|
| 2014/0068630 A1* | 3/2014 | Fildebrandt | G06F 9/546 719/313 |
| 2014/0149599 A1* | 5/2014 | Krishna | H04L 69/08 709/232 |

OTHER PUBLICATIONS

Basu, Arunava, Parallel Execution of jBOSS ESB Project When It Called by J8PM Process Instances, Jun. 18, 2012, pp. 1-3; retrieved on Jan. 3, 2014 from https://community.jboss.org/thread/201267?_sscc=t'.

* cited by examiner

PARALLEL MESSAGE PROCESSING ON DIVERSE MESSAGING BUSES

BACKGROUND

The present disclosure generally relates to a messaging bus, and more particularly to processing messages on diverse messaging buses.

Service Oriented Architecture (SOA) is a popular architectural paradigm for the development of software applications. For example, Web services provide the SOA to other applications via industry standard networks, interfaces, and protocols. The SOA is based on loosely-coupled and standards-based architectures. It is an approach to distributed computing that allows networked software resources to be leveraged. The SOA enables enterprises to integrate services, handle business events, and automate business processes more efficiently. For example, an SOA links information technology resources, data, services, and applications.

The SOA can include an enterprise service bus (ESB). An ESB is an underlying infrastructure for the SOA and implements the abstract design concept of the SOA. An ESB is a distributed middleware system for integrating Information Technology (IT) assets. An ESB may be an event-driven and standards-based messaging engine that provides services for complex architectures. The ESB provides infrastructure that links together services and clients to enable distributed applications and processes. The ESB typically provides a service to a client using a service deployed on an ESB server at runtime. In an example, the ESB is deployed to an application server and then services are deployed to the ESB. The ESB allows systems to interact through standard transports, such as file transfer protocol (FTP) and hypertext transfer protocol (HTTP), and to provide SOA-based applications. The ESB provides the capabilities of message handling, filtering, data transformation, content-based routing, and message repositories.

BRIEF SUMMARY

This disclosure relates to message processing in a messaging bus. Methods, systems, and techniques for parallel processing of messages by services residing in diverse messaging buses are provided.

According to an embodiment, a system for processing messages using a messaging bus includes an input queue that stores one or more input messages and an output queue that stores one or more output messages. The system also includes a first service residing in a first messaging bus and coupled to the input queue and the output queue. In a composite transaction, the first service processes a first message of the one or more input messages and generates a second message in accordance with processing the first message. The system further includes a transaction manager that places the second message in the output queue. The second message is routed from the output queue to a second service for processing. The second service resides in a second messaging bus diverse from the first messaging bus and processes, during the composite transaction, the second message.

According to another embodiment, a method of processing messages using a messaging bus includes processing, using a first service residing in a first messaging bus, a first message from an input queue. The method also includes generating a second message in accordance with processing the first message. The method further includes placing the second message in an output queue. The second message is routed from the output queue to a second service for processing. The second service resides in a second messaging bus diverse from the first messaging bus. In a composite transaction, the first service processes the first message and the second service processes the second message.

According to another embodiment, a non-transitory machine-readable medium includes a plurality of machine-readable instructions that when executed by one or more processors are adapted to cause the one or more processors to perform a method including: processing, using a first service residing in a first messaging bus, a first message from an input queue; generating a second message in accordance with processing the first message; and placing the second message in an output queue, where the second message is routed from the output queue to a second service for processing, where the second service resides in a second messaging bus diverse from the first messaging bus, and where in a composite transaction, the first service processes the first message and the second service processes the second message.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
   A. Process the Input Message in a Composite Transaction
   B. Process the Generated Message in the Composite Transaction
   C. Commit the Composite Transaction
III. Example Method
IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Integration technologies play an important role for middleware vendors. An example integration technology is an Enterprise Service Bus (ESB). An ESB may be used for client-server interactions and may logically interconnect available services and clients. An ESB typically communicates either internally between its ESB services or externally with Web services or other integration technologies.

Transaction boundaries logically start and end on the boundaries of the ESB. As such, it may be difficult for ESB services residing in diverse ESBs to interoperate to complete a composite transaction, either internally or externally. A service communicates internally with another service when both services reside in the same ESB. A service communicates externally with another service when both services reside in diverse ESBs. Enabling ESB services residing in diverse ESBs to interoperate may improve throughput behavior of operations. For example, an embodiment in which a plurality of ESB services residing in diverse ESBs is capable of interoperating to complete a composite transaction may provide for faster processing of messages. The composite transaction may include a plurality of sub-transactions.

In an example, when a first service residing in a first ESB processes an input message, the first service may generate a message in accordance with processing the input message. The processing of the input message and the generated message may be part of a composite transaction. The input message may be processed by the first service as part of a first sub-transaction of the composite transaction, and the generated message may be processed by a second service as part of a second sub-transaction of the composite transaction. When the second service resides in a second ESB diverse from the first ESB, the second service typically does not process the generated message until after the first service has committed the first sub-transaction. Accordingly, after the first service commits the first sub-transaction, the generated message is routed to the second service for processing. The second service may then initiate processing of the generated message and then commit the second sub-transaction in accordance with processing the generated message. This may waste time and not make use of idle resources because the second service does not initiate processing of the generated message until after the first service commits the first sub-transaction.

It may be desirable for diverse ESBs to interoperate to perform parallel processing of messages for a composite transaction. The present disclosure provides techniques to ensure distributed parallelism in a composite transaction among disparate ESBs. For brevity, the disclosure may describe an ESB as being the middleware technology that interconnects services, but this is not intended to be limiting and it should be understood that other technologies that provide these middleware capabilities are within the scope of this disclosure.

II. Example System Architectures

Figure 1:
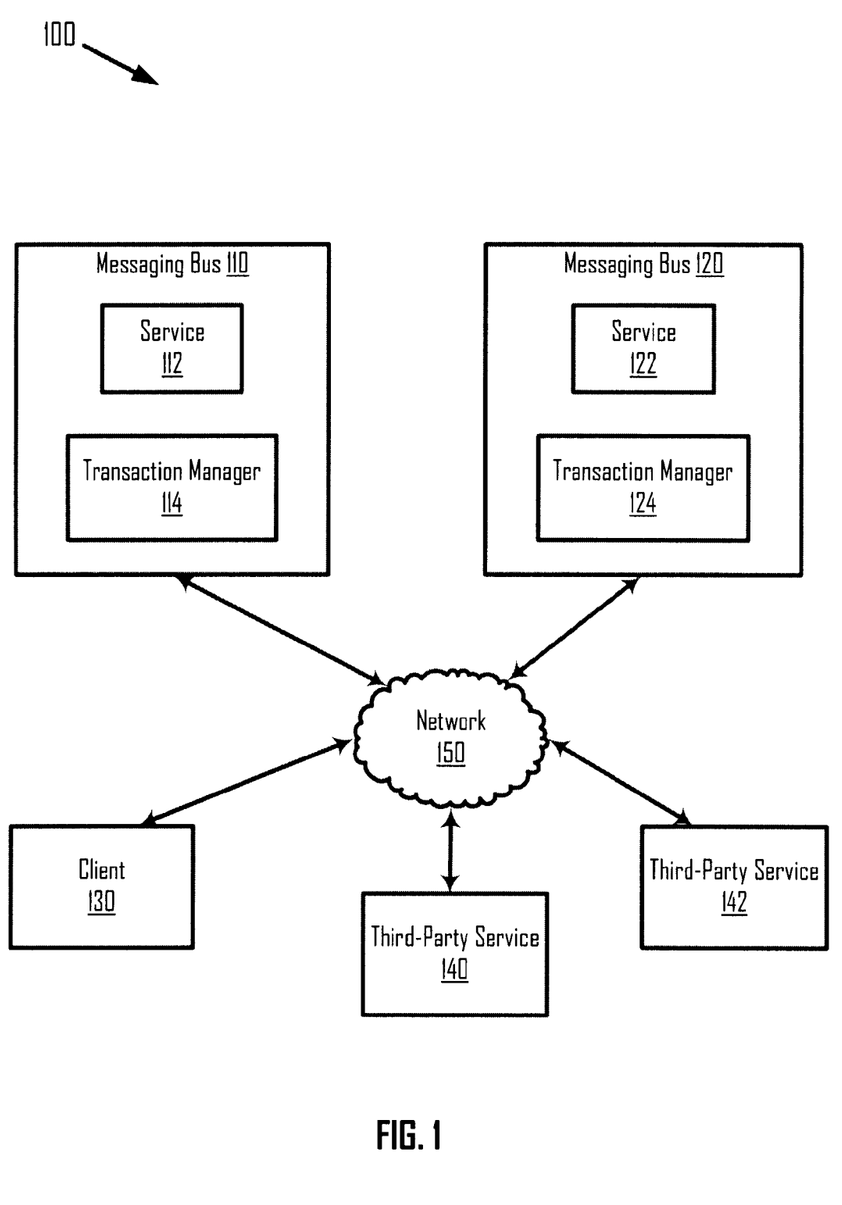
FIG. 1 is a block diagram illustrating a system for processing messages using a messaging bus, according to an embodiment.

FIG. 1 is a simplified block diagram 100 illustrating a system for processing messages using a messaging bus, according to an embodiment. Diagram 100 includes messaging buses 110 and 120, a client 130, and third-party services 140 and 142 coupled over a network 150. Network 150 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

In an embodiment, messaging buses 110 and 120 are ESBs. In an example, messaging buses 110 and 120 execute within the same ESB server. In such an example, service 112 is deployed on a first ESB server and service 122 is deployed on a second ESB server, and the first ESB server is the same as the second ESB server. In another example, messaging buses 110 and 120 execute on different ESB servers. In such an example, service 112 is deployed on a first ESB server and service 122 is deployed on a second ESB server, and the first ESB server is different from the second ESB server. Further, messaging bus 110 may be an ESB implementation different from messaging bus 120. In another example, messaging buses 110 and 120 may have the same implementation.

One or more clients (e.g., client 130) and one or more services (e.g., service 112) may bind to a messaging bus (e.g., messaging bus 110) and perform interactions through the messaging bus. Messaging bus 110 includes one or more services 112 and a transaction manager 114, and messaging bus 120 includes one or more services 122 and a transaction manager 124. Messaging bus 110, 120 may allow software components to find and invoke each other irrespective of the technology used in their implementations. A service may be included in a product (e.g., messaging bus 110, 120) in a concrete implementation. The service may refer to a software component that is able to accomplish a task and that is configurable. In an example, service 112 residing in messaging bus 110 may be configured to access third-party services (e.g., third-party service 140) over network 150. For example, client 130 may send a message to messaging bus 110 that invokes one or more services 112 residing in messaging bus 110. The invoked service residing in messaging bus 110 may call to third-party service 140 to complete a task responsive to the message. In another example, service 112 residing in messaging bus 110 may be configured to store files onto a file system, write data to or read data from a database, access a file transfer protocol (FTP) server to download files, or send an e-mail.

Transaction managers 114, 124 may enable a composite transaction to expand from service 112 residing in messaging bus 110 to service 114 residing in messaging bus 120. The present disclosure provides techniques to enable services residing on diverse messaging buses to interoperate to complete a composite transaction.

Figure 2:
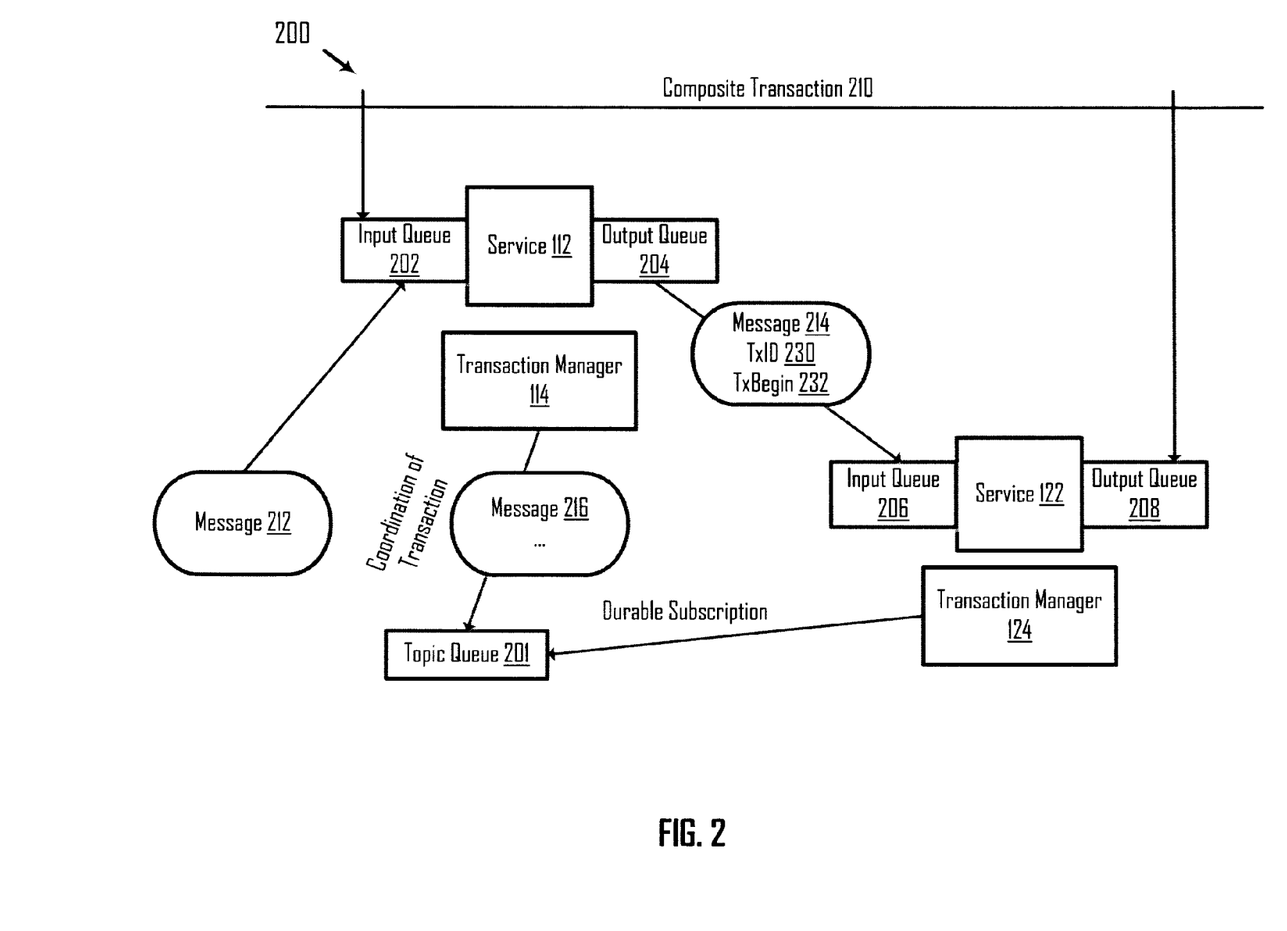
FIG. 2 is a block diagram illustrating messaging buses and interoperating, using a topic queue, to perform a composite transaction, according to an embodiment.

FIG. 2 is a block diagram 200 illustrating service 112 residing in messaging bus 110 and service 122 residing in messaging bus 120 interoperating, using a topic queue 201, to complete a composite transaction 210, according to an embodiment. Topic queue 201 enables communication between services (e.g., services 112 and 122) and/or transaction managers (e.g., transaction managers 114 and 124). For example, topic queue 201 enables a plurality of services residing on the same and/or diverse messaging buses to communicate with each other. Topic queue 201 may be a standard topic that accepts subscriptions and publishes messages to subscribers.

In an embodiment, transaction manager 114 subscribes service 112 to topic queue 201 and publishes one or more messages to topic queue 201 in accordance with various events. Similarly, transaction manager 124 may subscribe service 122 to topic queue 201 and obtain one or more messages published to topic queue 201 (e.g., messages published by transaction manager 114).

In an example, when service 112 commits a sub-transaction of a composite transaction, transaction manager 114 publishes a message to topic queue 201 indicating that service 112 has committed the sub-transaction of the composite transaction. In such an example, topic queue 201 may inform its subscribers of the message indicating that service 112 has committed the sub-transaction of the composite transaction. In another example, when a sub-transaction of a composite transaction has failed or has been rolled back, transaction manager 114 publishes a message to topic queue 201 indicating that the sub-transaction of the composite transaction has failed or has been rolled back. In such an example, topic queue 201 may inform its subscribers of the message indicating that the sub-transaction of the composite transaction has failed or has been rolled back. It should also be understood that transaction manager 114 may obtain one or more messages published to topic queue 201 and/or transaction manager 124 may publish one or more messages to topic queue 201 in accordance with various events.

Additionally, to ensure transactional behavior between the two messaging buses, messaging buses 110 and 120 may use a messaging system to communicate with each other. In FIG. 2, service 112 is coupled to an input queue 202 and an output queue 204, and service 122 is coupled to an input queue 206 and an output queue 208. An input queue stores one or more input messages and serves messages into the service to which the input queue is coupled. An output queue stores one or more output messages processed by the service to which the output queue is coupled. In an embodiment, the messaging system is JAVA® Messaging System (JMS), and topic queue 201 is a standard JMS component. Trademarks are the property of their respective owners. In such an embodiment, the input queues and output queues may be JMS queues, and messaging buses 110 and 120 may communicate through the JMS queues.

In FIG. 2, composite transaction 210 entails the processing of messages 212 and 214 and may include a plurality of sub-transactions that is performed by a plurality of services. Message 212 may be placed in input queue 202. In composite transaction 210, service 112 processes message 212 from input queue 202 and generates message 214 in accordance with processing message 212. Service 122 may process message 214 in parallel with the processing of message 212 by service 112. The processing of message 212 may entail performing a first sub-transaction of composite transaction 210, and the processing of message 214 may entail performing a second sub-transaction of composite transaction 210. Services 112 and 122 may commit each of their sub-transactions to eventually commit composite transaction 210.

In an embodiment, transaction manager 114 implements the routine in Table A to process an input message and commit or rollback a sub-transaction in accordance with processing the input message.

TABLE A

INPUTS: MESSAGE
main
subscribe to topic queue 201
while (receive MESSAGE from input queue 202) do
M := copy of MESSAGE             // line 5
generate unique TxID
set TxBegin to current time
augment MESSAGE with TxID and TxBegin
augment GENMESAGE with TxID and TxBegin
//during the following processing the copy of MESSAGE or other generated
//messages may be put into one or more queues (e.g., output queue 204 in FIG. 2)
result := process MESSAGE
if (result == FAIL)
rollback(TxId)
return                           //line 15
put TXEND(TxID, TxBegin, success) into topic queue 201
commit first sub-transaction
end
rollback (TxID)                  //line 20
put TXEND(TxID, TxBegin, fail) into topic queue 201

TABLE A-continued put M back to the input queue 202
rollback first sub-transaction In the example illustrated in Table A, transaction manager 114 subscribes service 112 to topic queue 201 and receives an input message (e.g., message 212). Accordingly, transaction manager 114 may receive and publish messages in accordance with events related to the subscribed service. Message 212 is an input message that is placed in input queue 202.

A. Process the Input Message in a Composite Transaction

Input messages may be placed in input queues for a variety of reasons. For example, an input message (e.g., message 212) may be placed in input queue 202 in response to a client's request. In another example, an input message (e.g., message 214) is a message generated in accordance with the processing of another message and the generated message is placed in the input queue for further processing. In an example, processing of message 212 may include selling stock on a stock exchange and processing of message 214 may include performing an action that may take place after selling the stock on the stock exchange (e.g., logging information about the sold stock and how much stock was sold, or reporting progress of how much stock was sold at a certain time). This description may refer to message 212 as the input message and message 214 as the generated message.

At line 5 in Table A, transaction manager 114 copies the input message before service 112 initiates processing of the input message. The copy of the original version of the input message may enable the original input message to be reprocessed if, for example, an error occurred in processing the input message and to ensure that the original and correct input message can be re-processed. Transaction manager 114 may generate a unique transaction identifier (TxID) 230 for composite transaction 210 and identify a current time (TxBegin) 232 at which processing of composite transaction 210 is initiated. TxID 230 may be a unique identifier that identifies composite transaction 210. Transaction manager 114 may be an entity that sits between input queue 202 and service 112 and augments the input message to include TxID 230 and TxBegin 232. In an embodiment, transaction managers 114 and 124 use JMS and augmenting the message includes adding headers to the message that include TxID 230 and TxBegin 232. Transaction manager 114 may feed the augmented message input to service 112 for processing. Service 112 may then process the augmented input message and generate a message in accordance with processing the augmented input message.

Transaction manager 114 places messages in an output queue. In an embodiment, transaction manager 114 augments each message to be placed in the output queue with TxID 230 and TxBegin 232 and places the augmented message in the output queue. In an example, the generated message (e.g., message 214) is an output message that transaction manager 114 augments and places in output queue 204. Accordingly, another service that processes the augmented message may determine to which composite transaction the message belongs (e.g., based on TxID 230) and also a time at which processing of the composite transaction to which the message is part of was initiated (e.g., based on TxBegin 232).

The output message in the output queue may be routed to a client in response to the client's request or may be routed to another service for further processing, depending on the message. In the latter case and using FIG. 2 as an example, rather than wait for service 112 to commit the first sub-transaction of composite transaction 210 (based on processing message 212) before placing the generated message in output queue 204, transactional manager 114 may place the generated message in output queue 204 before service 112 commits the first sub-transaction. In an example, transactional manager 114 places the generated message in output queue 204 immediately after the message is generated. Output queue 204 may be connected to one or more input queues, and each of the one or more input queues may be coupled to a different service. The generated message may be routed from output queue 204 to a connected input queue of the one or more connected input queues. In FIG. 2, the generated message may be routed from output queue 204 to input queue 206 for processing by service 122. Service 122 may process, during composite transaction 210, the generated message. Accordingly, services 112 and 122 may process the input message (e.g., message 212) and the generated message (e.g., message 214), respectively, in parallel.

Allowing messages to be processed in parallel may reduce the processing time to complete composite transaction 210 and enable workloads to be distributed across diverse ESBs. In an example, services 112 and 122 process the input message and the generated message, respectively, in parallel when a time period in which service 112 processes the input message overlaps with a time period in which service 122 processes the generated message. In another example, services 112 and 122 process the input message and the generated message, respectively, in parallel when service 122 initiates processing the input message before service 112 commits the first sub-transaction in accordance with processing the input message. As such, service 122 may consume an output of service 112 before it finishes processing the input message, and sub-transactions of composite transaction 210 may be performed in parallel.

At line 13 in Table A, a "result" of the processed input message is determined. When processing of the input message is unsuccessful (e.g., an error occurred), transaction manager 114 may call a rollback routine having TxID 230 as a parameter. Lines 20-23 in Table A illustrate an example rollback routine, in which transaction manager 114 publishes to topic queue 201 message 216 indicating that service 112 has failed or has rolled back the first sub-transaction of composite transaction 210. In such an example, message 216 may have parameters including TxID 230, TxBegin 232, and "fail." Transaction manager 114 may also rollback the first sub-transaction of composite transaction 210 and place the copy of the input message in input queue 202 so that the input message can be re-processed. Process flow may then proceed to line 4 of Table A, in which the initial version of the input message is received in input queue 202.

In another example, when processing of the input message is successful, service 112 may commit the first sub-transaction of composite transaction 210 and transaction manager 114 may publish to topic queue 201 a message 216 indicating that service 112 has committed the first sub-transaction of composite transaction 210. In such an example, message 216 may have parameters including TxID 230, TxBegin 232, and "success."

B. Process the Generated Message in the Composite Transaction

After the generated message is placed in input queue 206, transaction manager 124 in messaging bus 120 may assist in the processing of the generated message. Transaction manager 124 may be an entity that sits between input queue 206 and service 122. In an embodiment, transaction manager 124 implements the routine in Table B to process the generated message (e.g., that is routed from output queue 204 to input queue 206) and commit or rollback a sub-transaction in accordance with processing the generated message.

TABLE B

```
INPUTS: MESSAGE
main
subscribe to topic queue 201
let S be a time when transaction manager 124 subscribed to topic queue
  201
while (receive MESSAGE from output queue 204) do        //line 5
    M := copy of MESSAGE
    if MESSAGE.txBegin < S
        put MESSAGE back to output queue 204
    if received TXEND (TxID, TxBegin, fail) from topic queue 201
        continue;                                        //line 10
    result := process MESSAGE
    if (result == SUCCESS)
        wait for TXEND (TxID, TxBegin, RESOLUTION) on topic queue
          201
        if the RESOLUTION = success
            commit second sub-transaction              //line 15
        else rollback second sub-transaction
    else
        rollback second sub-transaction
    if not yet received TXEND (TxID, TxBegin, fail) on topic queue 201
        put M into output queue 204                    // line 20
```

In the example illustrated in Table B, transaction manager 124 subscribes service 122 to topic queue 201 and receives a message (e.g., message 214) in input queue 206. Accordingly, transaction manager 124 may receive and publish messages in accordance with events related to the subscribed service.

At line 4 in Table B, transaction manager 124 identifies a time "S" at which transaction manager 124 subscribed service 122 to topic queue 201. As discussed, transaction manager 114 may augment the generated message with TxBegin 232, the time at which processing of composite transaction 210 was initiated. Any time after TxBegin 232, composite transaction 210 may be rolled back and if transaction manager 124 subscribes to topic queue 201 after composite transaction 210 has already begun, transaction manager 124 may not obtain this rollback information. To ensure that service 122 does not process messages that are part of composite transactions that were initiated before the time at which transaction manager 124 subscribed the particular service to topic queue 201, transaction manager 124 may determine whether TxBegin 232 is older than "S" and determine whether to process or not process the message accordingly. In an example, transaction manager 124 determines whether a subscription time at which transaction manager 124 subscribed service 122 to topic queue 201 is subsequent to the initial processing time at which processing of composite transaction 210 was initiated. When the subscription time is determined to be subsequent to the initial processing time, transaction manager may place the generated message in output queue 204 without processing the generated message. Thus, another service (that was subscribed before the initial processing time at which processing of composite transaction 210 was initiated) may process the generated message that was placed back in output queue 204. When the subscription time is determined not to be subsequent to the initial processing time, service 122 may process the generated message.

Transaction manager 124 copies the generated message so that, for example, if an error occurs in processing the generated message, it can be re-processed using the original and correct version of the generated message.

C. Commit the Composite Transaction

In an embodiment, service 122 commits the second sub-transaction of composite transaction 210 only after service 112 has committed the first sub-transaction of composite transaction 210. Service 122 may finish processing message 214 before service 112 finishes processing message 212 and/or commits the sub-transaction. Accordingly, in such an embodiment, service 122 waits for an indication (e.g., from transaction managers 114, 124) that service 112 has committed the first sub-transaction and then commits the second sub-transaction in response to receiving the indication.

Transaction managers that are interested in whether a service has committed a particular sub-transaction as part of a composite transaction may subscribe to topic queue 201. As discussed, when processing of message 212 is successful, service 112 may commit the first sub-transaction in accordance with processing message 212 and transaction manager 114 may publish to topic queue 201 a message 216 indicating that service 112 has committed the first sub-transaction. Before committing the second sub-transaction, transaction manager 124 may determine a status of the first sub-transaction in accordance with one or more messages published to topic queue 201. Transaction manager 124 may listen for communication on topic queue 201 (e.g., messages published to topic queue 201). In an example, transaction manager 124 determines the status by sending a request to topic queue 201 for the status of the first sub-transaction and receiving a response responsive to the request from topic queue 201. In another example, topic queue 201 pushes the published message to transaction manager 124 without transaction manager 124 sending a request to topic queue 201 for the status of the first sub-transaction.

In an example, the status of the first sub-transaction may be that the first sub-transaction has been committed, the first sub-transaction has been rolled back, or the first sub-transaction has not yet been committed. Transaction manager 114 may publish a message to topic queue 201 with the appropriate status of the first sub-transaction. Transaction manager 124 may determine to which composite transaction the generated message belongs and also a time at which processing of the composite transaction was initiated because the generated message was augmented with this information. At lines 9 and 10 in Table B, when transaction manager 124 determines that the first sub-transaction of the composite transaction has failed or has been rolled back, transaction manager 124 may receive the generated message but does not process it. Transaction manager 124 may discard the generated message, thus saving processing cycles at messaging bus 120 by avoiding processing an unnecessary message (because the message will be re-generated and placed on output queue 204 for processing).

In an example, transaction manager 124 obtains a message published to topic queue 201 and the published message indicates that the first sub-transaction has failed or has rolled back. In such an example, the published message may have parameters including TxID 230, TxBegin 232, and "fail." As discussed in the example in Table A, when transaction manager 114 rolls back the first sub-transaction of the composite transaction, transaction manager 114 places the input message back in input queue 202 to be re-processed. Thus, when service 112 re-processes the input message, another message may be generated in accordance with processing the input message. Transaction manager 114 may then place the generated message in output queue 204 and the generated message may be routed to input queue 206 for processing by service 122 or to another input queue for processing by another service.

When transaction manager 124 determines that no messages have yet been published that indicate the first sub-transaction has failed or has been rolled back, transaction manager 124 may initiate processing of the generated message from input queue 206. As such, service 122 may process the generated message. At line 11 in Table B, a "result" of the processed generated message is determined.

In an example, when processing of the generated message is successful, transaction manager 124 may wait for a status of the first sub-transaction in accordance with one or more messages published to topic queue 201. In an example, transaction manager 124 obtains a message published to topic queue 201 and the published message indicates that the first sub-transaction has been committed. In such an example, the published message may have parameters including TxID 230, TxBegin 232, and "success." When processing of the generated message is successful and the status of the first sub-transaction is determined to be committed, transaction manager 124 may send an indication to service 122 to commit the second sub-transaction of composite transaction 210. Service 122 may commit the second sub-transaction of composite transaction 210 in response to the indication from transaction manager 124 to commit. When both the first and second sub-transactions of composite transaction 210 are committed, composite transaction 210 may then be committed.

In another example, when processing of the generated message is successful and the status of the first sub-transaction is determined to have been unsuccessful (e.g., failed or rolled back), transaction manager 124 may rollback the second sub-transaction of composite transaction 210. In keeping with the above example of service 112 processing the input message to commit the first sub-transaction, if the first sub-transaction is unsuccessful service 112 may re-process the input message and another message is generated in accordance with re-processing the input message. The generated message may then be routed to another service (e.g., service 122) for processing.

In another example, when processing of the generated message is unsuccessful (e.g., an error occurred) transaction manager 124 may rollback the second sub-transaction of composite transaction 210. If a message has not yet been published to topic queue 201 that the first sub-transaction was unsuccessful, transaction manager 124 may place the generated message in output queue 204.

The examples illustrated in Tables A and B are examples and are not intended to be limiting. For example, in Tables A and B, the composite transaction is committed when the first and second sub-transactions are committed. Although processing of a message has been described by performing a single sub-transaction (e.g., the first sub-transaction), other embodiments in which a service processes a message by performing a plurality of sub-transactions is within the scope of the present disclosure. In such an embodiment, the processing of message 212 may entail performing a first plurality of sub-transactions of composite transaction 210, the processing of message 214 may entail performing a second plurality of sub-transactions of composite transaction 210, and the first plurality of sub-transactions is committed before the second plurality of sub-transactions is committed.

As discussed above and further emphasized here, FIGS. 1 and 2 are merely examples, which should not unduly limit the scope of the claims. For example, it should be understood that although one client and two third-party services are illustrated, other embodiments including more than one client and/or more than two third-party services are within the scope of the present disclosure. Likewise, although two messaging buses are illustrated, other embodiments including more than two messaging buses are within the scope of the present disclosure.

III. Example Method

Figure 3:
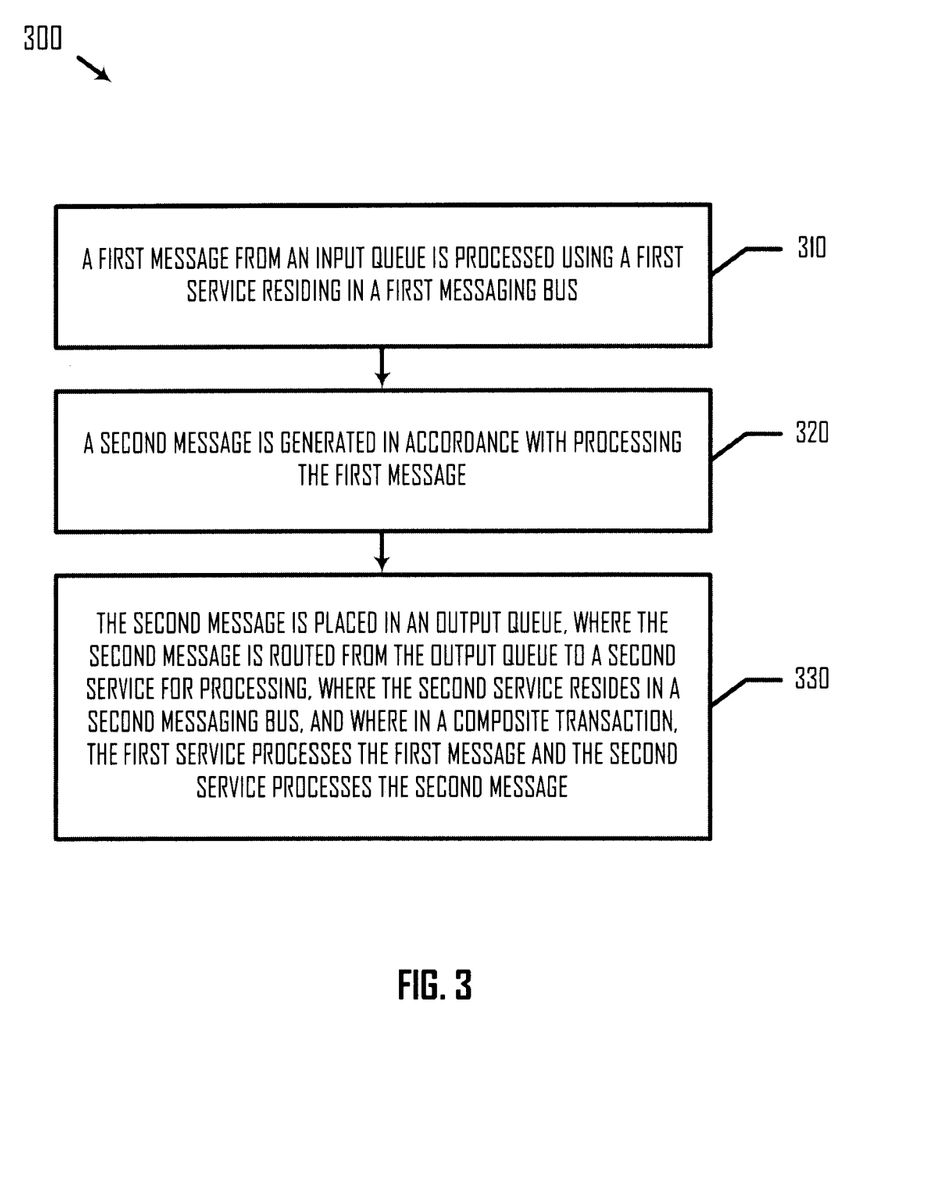
FIG. 3 is a flowchart illustrating a method of processing messages using a messaging bus, according to an embodiment.

FIG. 3 is a flowchart illustrating a method 300 of processing messages using a messaging bus, according to an embodiment. Method 300 is not meant to be limiting and may be used in other applications.

Method 300 includes blocks 310-330. In a block 310, a first message from an input queue is processed using a first service residing in a first messaging bus. In an example, service 112 processes message 212 from input queue 202, where service 112 resides in messaging bus 110. In a block 320, a second message is generated in accordance with processing the first message. In an example, service 112 generates message 214 in accordance with processing message 212. In a block 330, the second message is placed in an output queue, where the second message is routed from the output queue to a second service for processing, where the second service resides in a second messaging bus diverse from the first messaging bus, and where in a composite transaction, the first service processes the first message and the second service processes the second message. In an example, transaction manager 114 places message 214 in output queue 204, where message 214 is routed from output queue 204 to service 122 for processing, where service 122 resides in messaging bus 120 diverse from messaging bus 110, and where in a composite transaction, service 112 processes message 212 and service 122 processes message 214.

It is also understood that additional processes may be performed before, during, or after blocks 310-330 discussed above. It is also understood that one or more blocks of method 300 described herein may be omitted, combined, or performed in a different sequence as desired.

IV. Example Computing System

Figure 4:
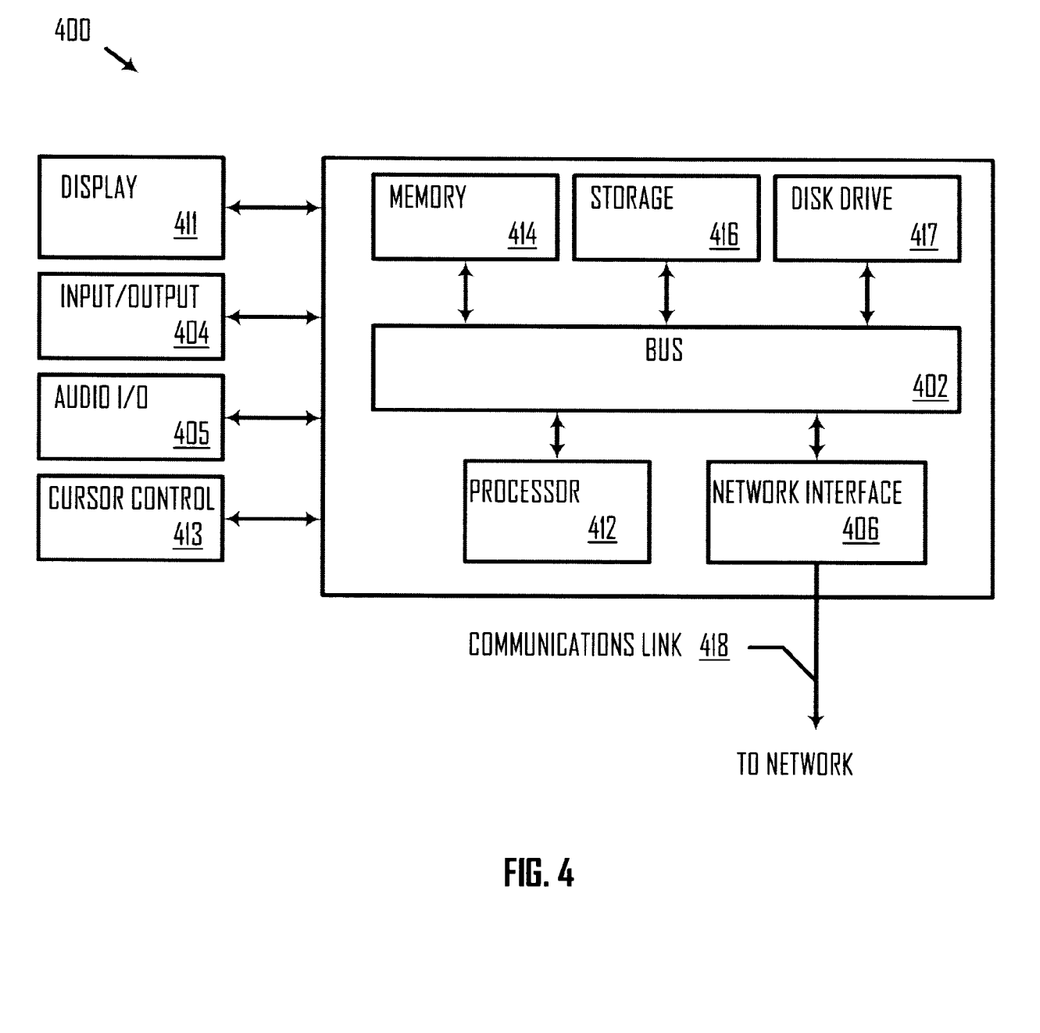
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, messaging bus 110, 122 may execute on a client or server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio I/O component 405 may also be included to allow a user to use voice for inputting information by converting audio signals into information signals. Audio I/O component 405 may allow the user to hear audio. A transceiver or network interface 406 transmits and receives signals between computer system 400 and other devices via a communications link 418 to a network. In an embodiment, the transmission is wireless, although other transmission mediums and methods may also be suitable. A processor 412, which may be a micro-controller, digital signal processor (DSP), or other processing component, processes these various signals, such as for display on computer system 400 or transmission to other devices via communications link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communications link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A system for processing messages using a messaging bus, the system comprising:
    a first messaging bus including a first service and a first transaction manager, wherein the first service is coupled to an input queue and an output queue, and a composite transaction includes a first sub-transaction and a second sub-transaction, wherein in the composite transaction, the first service processes a first message from the input queue and generates a second message in accordance with processing the first message, and wherein the first transaction manager places the second message in the output queue, and the second message is routed from the output queue to a second service for processing;
    a second messaging bus including the second service and a second transaction manager, wherein the second messaging bus is diverse from the first messaging bus and processes, during the composite transaction, the second message; and
    a topic queue that accepts subscriptions from a plurality of services residing on diverse messaging buses, wherein the first transaction manager subscribes the first service to the topic queue and the second transaction manager subscribes the second service to the topic queue,
    wherein in response to successful processing of the first message, the first service commits the first sub-transaction and the transaction manager publishes to the topic queue a third message indicating that the first service has committed the first sub-transaction, and
    wherein in response to receiving the third message indicating that the first sub-transaction has been committed and in response to successful processing of the second message, the second transaction manager sends an indication to the second service to commit the second sub-transaction.

2. The system of claim 1, wherein a time period in which the first service processes the first message overlaps with a time period in which the second service processes the second message, and wherein in response to the indication to commit the second sub-transaction, the second service commits the second sub-transaction.

3. The system of claim 1, wherein the processing of the first message entails performing the first sub-transaction of the composite transaction, and the processing of the second message entails performing the second sub-transaction of the composite transaction, and wherein the second service initiates processing the second message before the first service commits the first sub-transaction.

4. The system of claim 3,
    wherein the first transaction manager publishes one or more messages to the topic queue, and the second transaction manager receives one or more messages from the topic queue.

5. The system of claim 4, wherein the first transaction manager copies the first message, and wherein in response to unsuccessful processing of the first message, the first transaction manager places the copy of the first message in the input queue, rolls back the first sub-transaction, and publishes to the topic queue a fourth message indicating that the first service has rolled back the first sub-transaction.

6. The system of claim 5,
    wherein the second transaction manager determines a status of the first sub-transaction in accordance with one or more messages published to the topic queue, and
    wherein in response to receiving the fourth message indicating that the first sub-transaction has been rolled back, the second transaction manager rolls back the second sub-transaction and discards the second message.

7. The system of claim 1, wherein the first and second messaging buses have different messaging architectures.

8. The system of claim 1, wherein the first and second messaging buses have the same messaging architecture.

9. The system of claim 6, wherein in response to unsuccessful processing of the second message, the second transaction manager rolls back the second sub-transaction and places the second message in the output queue of the first service.

10. A method of processing messages using a messaging bus, the method comprising:
    processing, by a first service residing in a first messaging bus, a first message from an input queue;
    generating a second message in accordance with processing the first message;
    placing the second message in an output queue, wherein the second message is routed from the output queue to a second service for processing, wherein the second service resides in a second messaging bus diverse from the first messaging bus, and wherein a composite transaction includes a first sub-transaction and a second sub-transaction, and in the composite transaction, the first service processes the first message and the second service processes the second message;
    subscribing, by a first transaction manager, the first service to a topic queue that accepts subscriptions from a plurality of services residing on diverse messaging buses;
    subscribing, by a second transaction manager, the second service to the topic queue;
    in response to successful processing of the first message, committing the first sub-transaction and publishing to the topic queue a third message indicating that the first service has committed the first sub-transaction; and
    in response to receiving the third message indicating that the first sub-transaction has been committed and in response to successful processing of the second message, sending, by the second transaction manager, an indication to the second service to commit the second sub-transaction.

11. The method of claim 10, wherein the first service processes the first message and the second service processes the second message in parallel.

12. The method of claim 10, wherein the first service processes the first message in the first sub-transaction of the composite transaction, the second service processes the second message in the second sub-transaction of the composite transaction, and the second service initiates processing of the second message before the first service commits the first sub-transaction.

13. The method of claim 10, further including:
when processing of the first message is successful:
- committing the first sub-transaction of the composite transaction; and
- publishing to the topic queue a third message indicating that the first sub-transaction has been committed.

14. The method of claim 10, further including:
copying the first message; and
in response to unsuccessful processing of the first message:
- placing the copy of the first message in the input queue;
- rolling back the first sub-transaction; and
- publishing to the topic queue a fourth message indicating that the first sub-transaction has been has rolled back.

15. The method of claim 14, further including:
generating a unique transaction identifier for the composite transaction;
identifying a current time at which processing of the composite transaction is initiated;
augmenting the first message to include the unique transaction identifier and current time, wherein the first service processes the first message by processing the augmented message;
augmenting the second message to include the unique transaction identifier and current time, wherein the placing the second message in an output queue includes placing the augmented second message in the output queue, and wherein the publishing to the topic queue the fourth message includes publishing to the topic queue the unique transaction identifier and the current time.

16. The method of claim 15, further including:
listening, by the second transaction manager, to messages published to the topic queue;
determining a status of the first sub-transaction in accordance with one or more messages published to the topic queue;
in response to the indication to commit the second sub-transaction, committing, by the second service, the second sub-transaction;
in response to receiving the fourth message indicating that the first sub-transaction has been rolled back, rolling back the second sub-transaction and discarding the second message; and
in response to unsuccessful processing of the second message, rolling back the second sub-transaction and placing the second message in the output queue of the first service.

17. The method of claim 16, further including:
in response to the status of the first sub-transaction not yet having been determined in accordance with the one or more messages in the topic queue, waiting for the status of the first sub-transaction to be determined.

18. The method of claim 16, wherein the subscribing the second service occurs at a second current time, the method further including:
determining whether the second current time is subsequent to the first current time; and
in response to the second current time being subsequent to the first current time, placing the second message in the output queue of the first service without processing the second message.

19. A non-transitory machine-readable medium comprising a plurality of machine-readable instructions that when executed by one or more processors is adapted to cause the one or more processors to perform a method comprising: processing, by a first service residing in a first messaging bus, a first message from an input queue; generating a second message in accordance with processing the first message; placing the second message in an output queue, wherein the second message is routed from the output queue to a second service for processing, wherein the second service resides in a second messaging bus diverse from the first messaging bus, and wherein in a composite transaction includes a first sub-transaction and a second sub-transaction, and in the composite transaction, the first service processes the first message and the second service processes the second message; subscribing, by a first transaction manager, the first service to a topic queue that accepts subscriptions from a plurality of services residing on diverse messaging buses; subscribing, by a second transaction manager, the second service to the topic queue; in response to successful processing of the first message, committing the first sub-transaction and publishing to the topic queue a third message indicating that the first service has committed the first sub-transaction; and in response to receiving the third message indicating that the first sub-transaction has been committed and in response to successful processing of the second message, sending, by the second transaction manager, an indication to the second service to commit the second sub-transaction.

20. The non-transitory machine-readable medium of claim 19, wherein a time period in which the first message is processed overlaps with a time period in which the second message is processed.

* * * * *